J. A. GREENE.
HEATER AND VENTILATOR.
APPLICATION FILED MAR. 15, 1919.
1,354,479.
Patented Oct. 5, 1920.
3 SHEETS—SHEET 1.
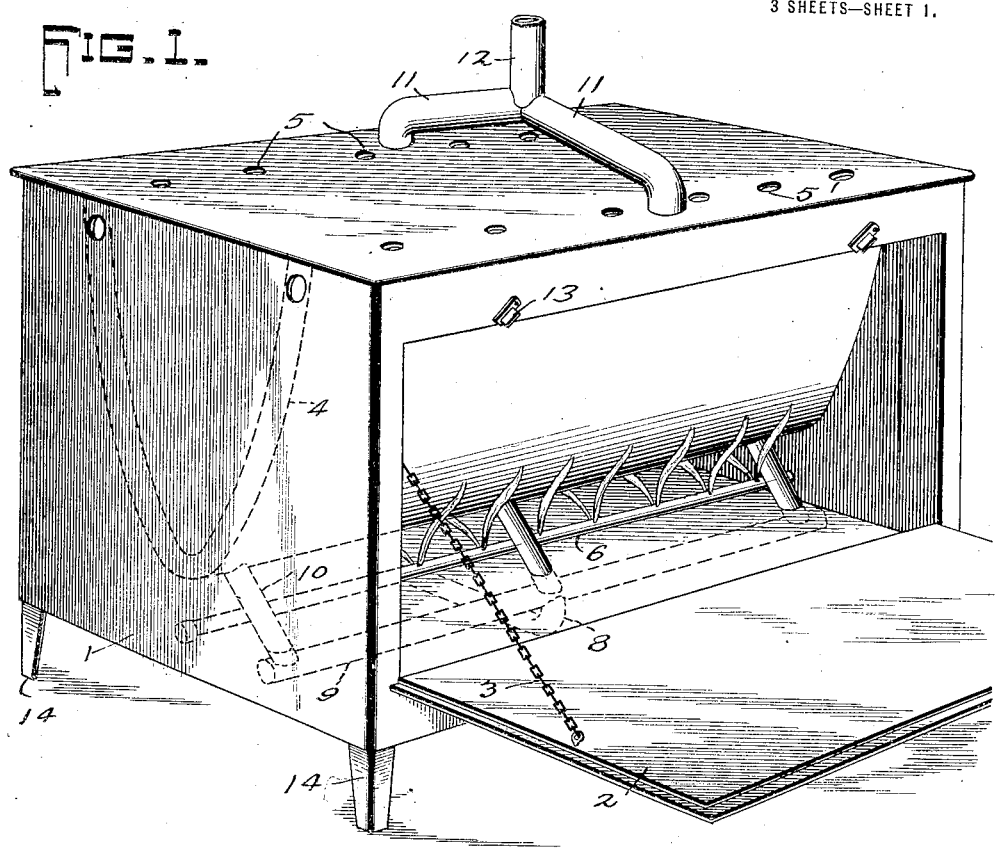
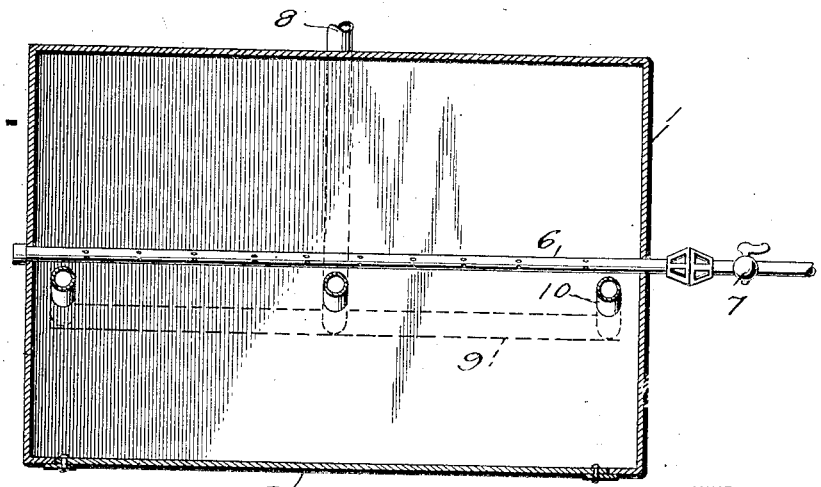
WITNESSES
INVENTOR
JOHN A. GREENE
BY
ATTORNEYS

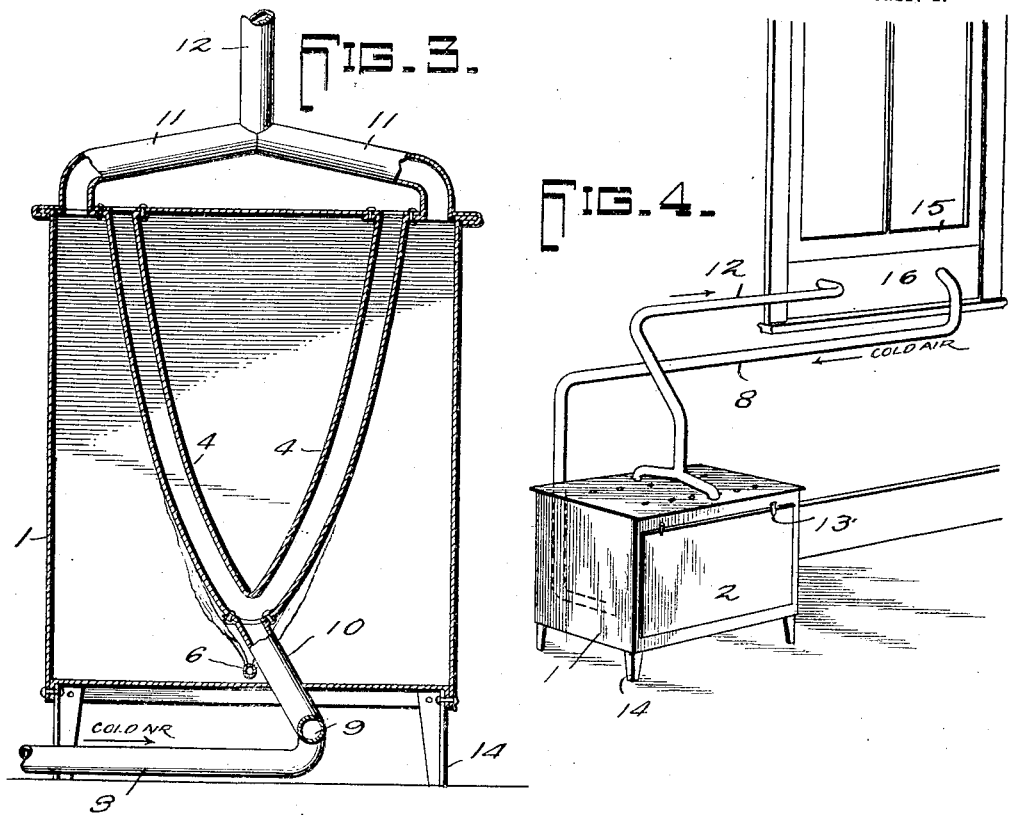

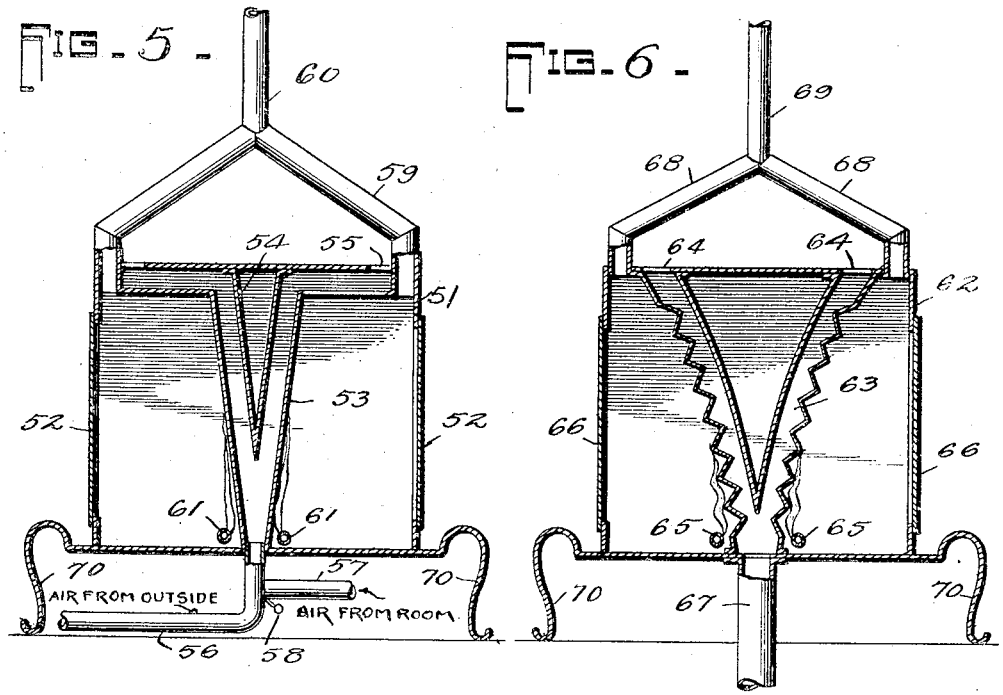

UNITED STATES PATENT OFFICE.

JOHN ALBERT GREENE, OF LONG BEACH, CALIFORNIA.

HEATER AND VENTILATOR.

1,354,479.   Specification of Letters Patent.   Patented Oct. 5, 1920.

Application filed March 15, 1919. Serial No. 282,919.

*To all whom it may concern:*

Be it known that I, JOHN ALBERT GREENE, a citizen of the United States, and a resident of Long Beach, in the county of Los Angeles and State of California, have invented certain new and useful Improvements in Heaters and Ventilators, of which the following is a specification.

My invention is an improvement in heaters and ventilators, and has for its object to provide mechanism of the character specified adapted for comfortably heating a room or rooms wherein fresh air is taken from the outside, heated and delivered to the room or rooms, while the foul air with the products of combustion is delivered outside the room, thus insuring, in addition to the heating of the room, a thorough ventilation of the same.

In the drawings:

Figure 1 is a perspective view of one embodiment of the invention;

Fig. 2 is a horizontal section;

Fig. 3 is a transverse vertical section;

Fig. 4 is a perspective view showing the method of connecting the heater with the outer air; and Figs. 5 and 6 are transverse vertical sections of other embodiments.

In the embodiment of the invention shown in Figs. 1 and 2, the improved heater comprises an outer casing 1 having an opening in its front which may be closed by a door 2, the said door being hinged to the casing at its lower edge, and being supported from swinging farther down than a horizontal position by a flexible member 3, in the present instance a chain. Within the interior of the casing is arranged a heating chamber 4, which is substantially V-shaped, consisting of two portions extending at an acute angle with respect to each other, but curved outwardly away from each other.

The upper edges of the heating chamber are secured to the top wall of the casing, and this wall has a series of outlet openings 5 at each connection for permitting heated air to pass from the heating chamber through the openings to the room to be heated. The peak or apex of the heating chamber is spaced above the bottom of the casing 1, and beneath this peak or apex is arranged a heater 6, in the present instance a gas heater, and in the form of a pipe extending longitudinally of the casing and supported by the end walls and having series of discharge openings in its upper surface, the members of each series diverging outwardly and away from the members of the other series. Thus the flames play on both sides of the heating chamber, thoroughly heating the air that passes through the same.

The supply of fuel is controlled by a valve 7, and it will be obvious that any other form of heater might be used if desired. Cold air is supplied to the heating chamber and this air may be taken from the room being heated or from the outer air. The said air is supplied by a pipe 8, which connects with a pipe 9 extending longitudinally of the casing beneath the same, and the pipe 9 has branches 10 which extend upwardly through the bottom of the casing and communicate with the heating chamber near its apex, in the present instance there being three branches provided. The foul air laden with the products of combustion is discharged at the outer side of each portion of the heating chamber by means of pipes 11. These pipes extend inwardly toward the center of the casing and connect with a common discharge pipe 12. The door 2 has catches 13 for supporting it in closed position, and the casing is supported by suitable legs 14.

The arrangement of the pipes 8 and 12 and the manner of connecting them with the outer air is shown in Fig. 4. In this arrangement the lower sash 15 is raised slightly and a plate 16 is slipped beneath the sash, the plate closing the space left open by the lifting of the sash. This plate has openings through which the pipes 8 and 12 extend, and it will be obvious that the cold air may flow in through the pipe 8 while the foul air may flow out through the pipe 12.

In the embodiment of the invention shown in Fig. 5 the casing 51 has doors 52 at its opposite sides, either or both of which may be opened or closed. The heating chamber 53 is arranged at the center of the casing, and this chamber is approximately T-shaped in cross section, the stem of the T extending vertically at the center of the casing, while the arms extend toward the opposite side walls. The side walls of the body portion of the heating chamber, that is, of the vertical portion, diverge toward the top, and a substantially V-shaped deflecting or division partition 54 is arranged between the said walls at their top, the partition extending somewhat greater than half the height of the casing. Openings 55 are provided in the top of the casing, at the outer edge of each lateral extension of the heating chamber, and cold air is supplied to the heating chamber either from the outside by means of a pipe 56 or from the room by means of a pipe 57. This pipe 57 opens into the pipe 56 near its connection with the heating chamber, and a damper 58 is arranged at this point to regulate the supply and the relative proportions. Pipes 59 lead from the top of the casing at each side thereof and from the combustion chamber, connecting with a common pipe 60 for leading the products of combustion to the outer air. The air is heated by means of heaters 61, gas heaters in the present instance, which are arranged at the opposite sides of the vertical portion of the heating chamber.

In Fig. 6 the casing 62 has a substantially V-shaped heating chamber 63, the two portions of the heating chamber diverging toward the top of the casing, and the outer wall of each portion is horizontally corrugated or of zigzag form in cross section, as shown. The two portions communicate with the room by openings 64, and the air in the chamber is heated by heaters 65, gas heaters in the present instance, the said heaters being arranged at the bottom of the outer face of the chamber. Doors 66 are provided in each side wall of the casing and the cold air is supplied by a pipe 67 communicating with the bottom of the heating chamber. The foul air is carried away by pipes 68 which communicate with a common pipe 69 leading to the outer air.

With the improved heater not only is the room heated but it is thoroughly ventilated, cold air being taken from the outside, heated and delivered to the room, while the foul air from the burning fuel is carried away. The air is thus heated before it enters the room, eliminating drafty floors.

I claim:

1. A heater comprising a casing provided with a door, a heating chamber located within said casing and including divergent side portions defining separate channels communicating with each other at their lower ends and having their upper ends leading to holes formed in the top of the casing, heating means located beneath said heating chamber and adapted to heat the exterior walls of both sides thereof, a cold air admission pipe leading through the bottom of this casing and leading into the bottom of said heating chamber, and foul air exit pipes leading from the top of the casing outwardly of the sides of said heating chambers.

2. A heater comprising a casing provided with a door, a heating chamber located within said casing and including divergent side portions defining separate channels communicating with each other at their lower ends and having their upper ends leading to holes formed in the top of the casing, heating means located beneath said heating chamber and adapted to heat the exterior walls of both sides thereof, a cold air admission pipe leading through the bottom of this casing and leading into the bottom of said heating chamber, foul air exit pipes leading from the top of the casing outwardly of the sides of said heating chamber, and a common pipe leading to the exterior atmosphere and connecting said last named pipes.

JOHN ALBERT GREENE.

Witnesses:
JOHN HERBERT TASSELL,
G. B. WOLF.